April 30, 1935.    P. E. EDELMAN    1,999,408
ELECTROLYTIC APPARATUS
Filed April 2, 1929
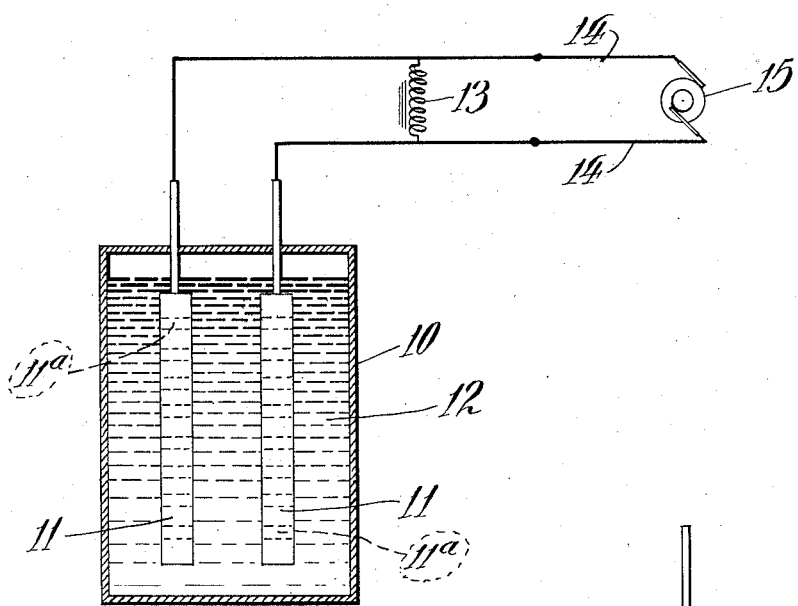
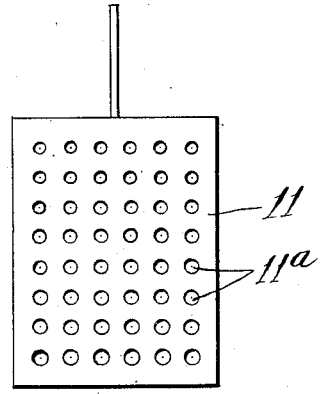
Inventor:
Philip E. Edelman,
By Banning & Banning
Attorneys.

Patented Apr. 30, 1935

1,999,408

UNITED STATES PATENT OFFICE 1,999,408

ELECTROLYTIC APPARATUS

Philip E. Edelman, Chicago, Ill., assignor, by mesne assignments, to Robert T. Mack, trustee, Chicago, Ill.

Application April 2, 1929, Serial No. 352,011

5 Claims. (Cl. 175—315)

This invention relates to electrolytic apparatus, such as condensers and/or rectifiers, and the like, employing a film forming metallic electrode and a non-metallic electrolyte.

An object of this invention is to improve the efficiency of such apparatus, mitigating the detrimental effect of rising temperature thereon. A further object is to provide an improved film forming metallic electrode therefor having the property of satisfactory operation at higher temperatures than 85 degrees centigrade.

A further object is to provide an improved non-metallic co-operating electrolyte therefor having rapid polarizing and film forming properties which are effective at high operating temperatures as well as at room temperature, thereby affording a large factor of safety for operation.

A further object is to provide an electrolytic apparatus capable of continuous use as a power factor correcting alternating current condenser operated on a source of commercial alternating current supply.

These and other objects are accomplished by this invention, which is fully described in the following specification and shown in the accompanying drawing, in which—

Figure 1 is a vertical section through a single cell and showing it diagrammatically in circuit; and Fig. 2 is a front elevation of an electrode.

The embodiment illustrated shows a single cell 10 having spaced perforated electrodes 11 of beryllium, aluminum, tantalum, or the like, immersed in a liquid electrolyte 12, as will later be described, the electrodes 11 being connected in parallel with an inductive load 13 on a line 14 supplied with alternating current from a suitable source 15, the cell tending to correct the power factor of the inductive load.

A limitation to the use of electrolytic apparatus for such a purpose has heretofore been reached by the detrimental effect of increasing temperature reaching to a range at which the efficiency of such apparatus is destroyed. When apparatus of this class is connected to a non-polarized source of alternating current continuously, as for power factor correction of circuits connected to an induction motor or other inductive load, it is necessary to provide against the detrimental effect of heat losses. This difficulty can be remedied by providing an improved composition for the metallic film forming contactor and its co-operating non-metallic or electrolyte contactor, thereby overcoming the limitation of brief time service and permitting continuous operation of the electrolytic apparatus on alternating current circuits.

Any known film forming metal, such as aluminum, tantalum or beryllium may be used, but for the film forming contactor I prefer to employ the metal beryllium, either substantially pure or alloyed with other metal or plated thereon. Beryllium is light, hard, and tough, and has a melting point at 1280 degrees centigrade, and the film formed thereon is moreover of surprisingly greater permanence and stability. It is not suitable for use with the usual electroyltes operable with aluminum, because it is attacked thereby.

For the non-metallic contactor or electrolyte, I prefer to employ a mixture composed of three pounds of powdered first-grade gum arabic and one eighth ounce of powdered potassium or ammonium bitartrate dissolved in thirteen pounds of hot chemically pure glycerine, the mixture having a boiling point at substantially 150 degrees centigrade. This mixture affords a non-aqueous electrolyte contactor having the property of affording an operating film on a film-forming metal, such as beryllium or aluminum when current is applied therethrough at either direct flowing, rectified, pulsating, or alternating flow. The film forming action is rapid and effective on 25 or 60 cycle alternating current within the wide temperature range of 0 to 140 degrees centigrade. The film-forming metal is not destroyed thereby, because it is passive thereto.

For electrolytic apparatus used as a rectifier, the film-forming metal electrode will be used in contact with the non-metallic electrolyte mixture set forth, while the necessary connection to the latter will be made by means of a non-film forming metal contactor, such as duriron in contact therewith. When the electrolytic apparatus is to be used for selective conduction to pass more current in one direction than reversely but nevertheless to pass some current in either direction, two film-forming metal electrodes will be used in contact with the said electrolyte mixture, one thereof being proportioned with greater area than the other.

When the electrolytic apparatus is to be used as an alternating current condenser, two film-forming metal electrodes or contactors in contact with said electrolyte mixture of substantially equal surface area are preferred, though slight inequalities in area exposed will not prevent satisfactory operation. The film-forming metal used for low operating potentials up to 200 volts may be any metal of this character, such as aluminum, but above this operating voltage I prefer to use the aforesaid beryllium metal, or alloy, or an electrodeposited layer thereof, for the film-forming metal contactor in order to withstand increasing heat losses with increasing operating voltages without detriment. An aluminum alloy containing as little as 1% of beryllium is suitable. A large safety factor is thereby afforded.

While preforming of the film on the metal electrode may be practiced as customary in the prior art, it is unnecessary with the aforedescribed composition for the electrodes because the film forming electrodes becomes rapidly polarized with respect to the non-metallic electrolyte mixture set forth as soon as current is supplied thereto. This current may be alternating without destruction of the film thus formed on the surface of the electrode.

When the electrolytic apparatus is used as a power factor condenser, correction on inductive loaded circuits of low commercial voltage may be continuously had up to as high as 95% power factor on circuits as low as 50% normal power factor, while the heat losses in the condenser will not cause normal operation thereof to increase the temperature more than a few degrees, so that such a condenser can normally be operated continuously below 75 degrees centigrade. The electrode or film forming metal contactor area will be selected according to the kilovolt-ampere capacity required. For example, in the case of a single phase alternating current supply for an induction condenser type motor of 1 horsepower size, a condenser of this type of 40 mfds. capacity may be required for starting the motor, while one of 13 mfds. capacity suffices for running therewith to maintain a fairly high power factor.

An operating characteristic of this apparatus is that whereas the surface of the film forming contactor may be seen to glow dimly in the dark at the contact junction with the aforesaid nonmetallic electrolyte, there is an absence of internal sparking in the apparatus used as a condenser as set forth, and an absence of sparking at the border surface where the electrode leaves the electrolyte. Consequently a minimum heat loss occurs even on alternating current operation, and when the apparatus is arranged as a condenser with two film-forming metal electrodes of equal area in contact with the electrolyte mixture aforesaid, both said metal electrodes behave uniformly to alternating current flow with an absence of internal sparking. It may be remarked that while this invention is concerned with the composition of the electrodes and electrolytes, usual factors of design for such apparatus are to be observed, such as properly spaced terminals and small electrode distance between the condenser electrodes.

The electrolyte mixture may be varied in relative percentage composition according to the operating voltage, and it is permissible to increase the weight of gum arabic used to as much as will dissolve in a saturated hot solution thereof in the glycerine. The relative amount of potassium or ammonium bitartrate used may also be varied according to the operating voltage. For increasing the operating voltage the proportion of the gum arabic should be increased, while the amount of potassium or ammonium bitartrate is reduced. Any desired number of such condenser cells may be used in series or parallel groups as required.

The perforations 11$^a$ in the electrodes 11 should be of greater diameter than the thickness of the metal. Their function is (1) to permit the thinner circulation of the electrolyte in keeping the temperature down to a reasonable value; and (2) to facilitate the rapid escape of gas escaping at the electrode surface. The perforations are made before the surface is coated with its dielectric film, thereby increasing the effective surface of the electrode. The thickness of these electrodes may be as little as $\frac{1}{32}$ of an inch for use on alternating current circuits, but more thickness is preferable to get rid of the heat generated.

While I have shown and described but a few embodiments of my invention, it is to be understood that it is capable of many modifications. Changes, therefore, in the construction and arrangements may be made which do not depart from the spirit and scope of the invention as disclosed in the appended claims.

I claim:

1. In electrolytic apparatus, in combination, film-forming metal electrode contactors, and a co-operating electrolyte contactor therefor consisting of a mixture of ammonium bitartrate, gum arabic and glycerine.

2. In electrolytic apparatus, in combination, film-forming aluminum-beryllium alloyed metal electrode contactors, and a co-operating electrolyte contactor therefor containing gum arabic, potassium bitartrate and glycerine.

3. In electrolytic apparatus, film-forming metal electrode contactors of substantially uniform area separated by and contacting with an electrolyte contactor mixture of potassium bitartrate, gum arabic, and glycerine.

4. Electrolytic apparatus suitable for use as an alternating current condenser composed of a plurality of film-forming metal contactors each having substantially equal surface areas contacting with a co-operating nonmetallic electrolyte contractor mixture of glycerine, gum arabic and potassium bitartrate.

5. In electrolytic apparatus, in combination, a contactor having a surface containing beryllium, and a co-operating non-metallic passive electrolyte contactor comprising a glycerine and gum arabic mixture of the empirical bitartrate class disclosed.

PHILIP E. EDELMAN.